(12) United States Patent
Gwyther

(10) Patent No.: US 6,511,483 B1
(45) Date of Patent: Jan. 28, 2003

(54) SPINAL CORD REMOVAL TOOL

(75) Inventor: Peter Gwyther, Madison, CT (US)

(73) Assignee: Jarvis Products Corporation, Middletown, CT (US)

( * ) Notice: Subject to any disclaimer, the term of this patent is extended or adjusted under 35 U.S.C. 154(b) by 6 days.

(21) Appl. No.: 09/915,099

(22) Filed: Jul. 25, 2001

(51) Int. Cl.[7] .............................................. A61B 17/00
(52) U.S. Cl. ........................................................ 606/79
(58) Field of Search .......................... 606/79, 104, 108, 606/138, 179, 180

(56) References Cited

U.S. PATENT DOCUMENTS 5,074,044 A * 12/1991 Duncan et al.
5,571,106 A * 11/1996 Coufal et al. ................ 606/180

FOREIGN PATENT DOCUMENTS

| DE | 834287 | * | 3/1952 |
| DE | 197 57 745 C1 | | 1/1999 |
| EP | 0890 313 B1 | | 1/1999 |
| FR | 2127160 | * | 10/1972 |

* cited by examiner

Primary Examiner—Timothy L. Maust
Assistant Examiner—Khoa D. Huynh
(74) Attorney, Agent, or Firm—DeLio & Peterson, LLC

(57) ABSTRACT

A spinal cord removal tool for removing a spinal cord and spinal cord membrane from a carcass includes a spinning blade disk having multiple removal blades mounted around its perimeter, each removal blade having a forward facing cutting edge that can enter the spinal cord channel and side cutting edges that cooperate with floating self-adjusting side blades to chop the spinal cord membrane as it is brought into the tool.

9 Claims, 1 Drawing Sheet

SPINAL CORD REMOVAL TOOL

BACKGROUND OF THE INVENTION

1. Field of the Invention

The present invention relates to tools for removing the spinal cord from carcasses.

2. Description of Related Art

Spinal cord removal tools are used in the processing of carcasses to remove the spinal cord from the spinal cord channel surrounding it. Such tools may also be referred to as "spinal cord grinders" due to the difficulty of removing the spinal cord completely from the bony channel surrounding it, which has many irregularities and protrusions. A related problem is the elongated spinal cord membrane, which tends to wrap around the shaft of motorized removal tools and interfere with operation of the tool and proper removal of the spinal cord.

One tool that addresses these problems in removing the spinal cord is seen in European Patent EP 0 890 313 B1, which uses a motor driven blade disk spinning inside a housing. The blade disk includes multiple spinal cord removal blades oriented perpendicular to the plane of the disk. The removal blades are spaced around the perimeter of the blade disk and project out from the housing on the working side as the disk spins. Each removal blade includes a front cutting edge, a left cutting edge and a right cutting edge.

The front cutting edges are rounded and project outward from the perimeter of the blade disk that supports them. The shape of the removal blades allows them to penetrate into the spinal cord channel to scrape and cut out the spinal cord as the blade disk spins. The operator guides the exposed perimeter of the spinning blade disk, with the protruding removal blades, into the spinal cord channel.

The side cutting edges on the removal blades cooperate with fixed side blades mounted on left and right sides of the housing to cut up the spinal cord membrane as it is brought into the tool. The fixed side blades are mounted at an angle to the spinning side edges of the removal blades and provide a scissors-like cut to shear the spinal cord membrane and cut it into smaller pieces. A vacuum opening is located inside the tool near the side blades to remove the waste material.

One difficulty with the tool shown in EP 0 890 313 B1 is the fixed location of the side blades relative to the side edges of the removal blades. As the blades wear, a gap quickly develops between these blades and the shearing action becomes intermittent. When the side blades fail to shear the spinal cord membrane, it wraps onto the shaft of the tool. The tool must then be disassembled and cleaned and new blades must be installed. The initial shaping of the blades by grinding is also very difficult in this design in view of the manner in which the side blades are non-adjustably mounted with a fixed spacing between them.

Bearing in mind the problems and deficiencies of the prior art, it is therefore an object of the present invention to provide a spinal cord removal tool that operates for longer than prior art tools before requiring cleaning or adjustment.

It is another object of the present invention to provide a spinal cord removal tool with self-adjusting side blades.

Still other objects and advantages of the invention will in part be obvious and will in part be apparent from the specification.

SUMMARY OF THE INVENTION

The above and other objects, which will be apparent to those skilled in art, are achieved in the present invention, which is directed to a spinal cord removal tool for removing a spinal cord and spinal cord membrane from a carcass. The tool includes a motor, a housing, and a blade disk mounted in the housing. Multiple spinal cord removal blades are mounted around the perimeter of the blade disk, each removal blade having a front cutting edge, a left cutting edge and a right cutting edge. The motor spins the blade disk within the housing and a portion of the blade disk, is exposed on a working side of the tool.

The operator aligns the plane of the spinning blade disk with the spinal cord channel and brings the working side into contact with the spinal cord channel to begin the removal process. The shape of the removal blades allows them to enter the channel and remove the spinal cord and spinal cord membrane.

The blade disk spins between a left side blade and a right side blade. The side blades are mounted on the housing for motion towards and away from the left and right cutting edges of the spinal cord removal blades. A left side spring pushes the left side blade in towards the left cutting edges of the spinning spinal cord removal blades. A right side spring pushes the right side blade in towards the right cutting edges of the spinal cord removal blades. The floating spring mounting of the side blades makes them self-adjusting and ensures that they always remain in cutting contact with the side edges of the spinning removal blades.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
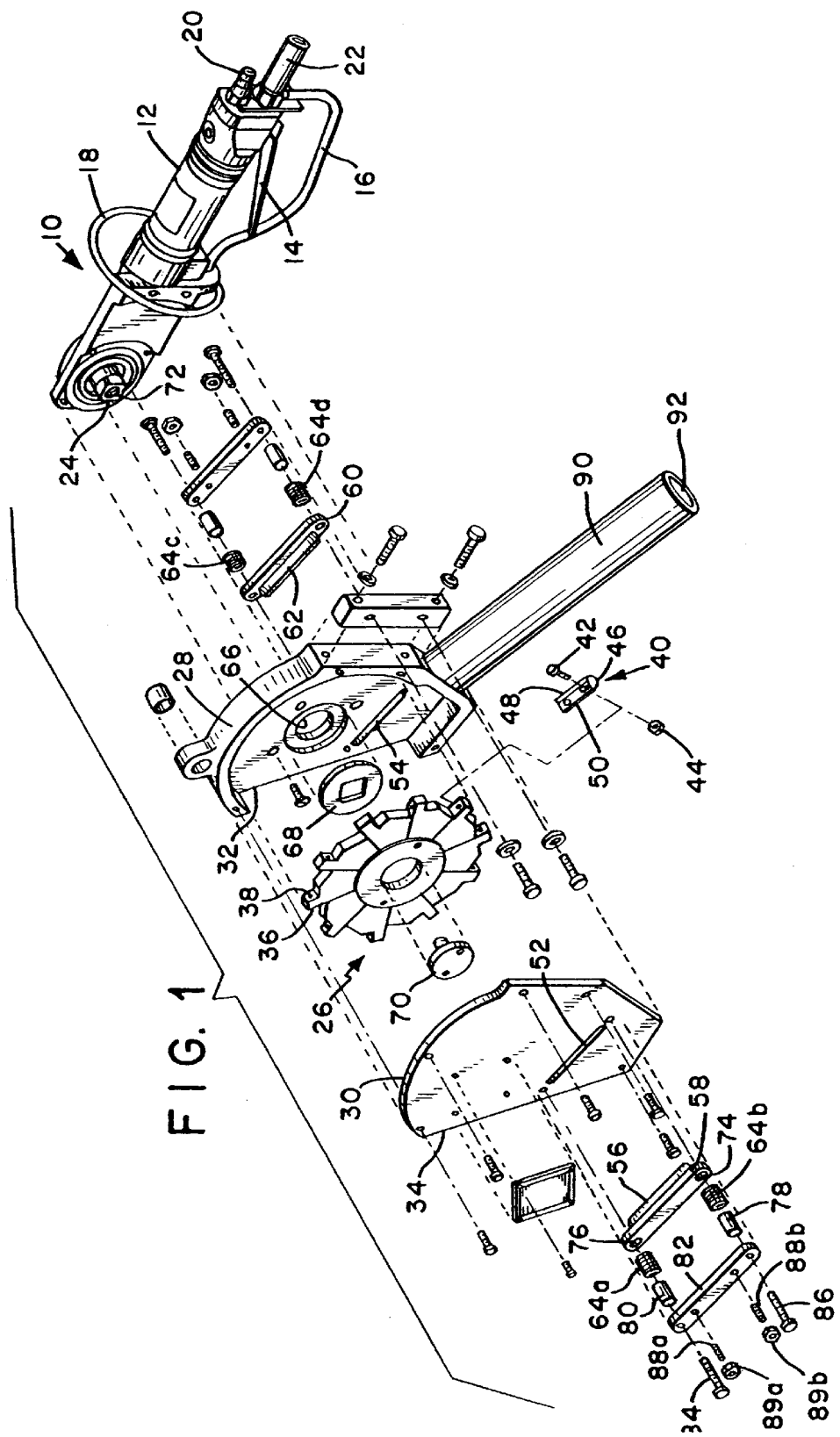
FIG. 1 is an exploded perspective view of the spinal cord removal tool of the present invention.

Referring to FIG. 1, the present invention includes a motor 10 having a handle 12, a trigger 14 for operating the tool and hand guards 16, 18. In the preferred embodiment, the motor 10 is a pneumatic motor connected to a supply of pressurized air via air inlet 20. Air is exhausted through exhaust outlet 22. In other embodiments, the motor may be an electric motor or the tool may be hydraulically powered, if desired.

When trigger 14 is actuated, the motor 10 spins square shaft 24, which drives the blade disk 26 in rotary motion inside of housing 28. Cover 30 forms a part of the housing so that the blade disk 26 is exposed only along a front working edge extending outward from edges 32 and 34 of the housing.

Square motor shaft 24 extends through opening 66 in housing 28, through washer 68 and into engagement with the blade disk 26. Cap screw 70 engages internal threads 72 in shaft 24 to hold the blade disk on the shaft 24.

Blade disk 26 is provided with multiple mounting surfaces 36 that are oriented perpendicular to the plane of the blade disk. Each mounting surface is provided with a mounting hole 38 for mounting a corresponding removal blade 40.

In the preferred design shown, there are ten removal blade mounting surfaces equally spaced around the perimeter of the blade disk 26 for mounting ten corresponding removal blades 40. For clarity in the drawing, only one removal blade 40 is shown. Mounting screw 42 and nut 44 securely hold the removal blade 40 onto its corresponding mount.

Each removal blade 40 includes a front cutting edge 46, which is preferably rounded, a right side cutting edge 48 and a left side cutting edge 50. The right and left side cutting edges are parallel to each other and are parallel to the plane of the blade disk when mounted thereon. The cover 30 of the housing is provided with a blade slot 52 on the left side of the cutting disk and the housing 28 is provided with a corresponding blade slot 54 on the right side.

Slot 52 receives the cutting edge 56 of a left side blade 58. Slot 54 receives the cutting edge 62 of a corresponding right side blade 60. The cutting edges 56 and 62 of the non-rotating side blades lie in a plane that is parallel to the side cutting edges of the rotating removal blades.

In contrast to the fixed side blade design of the prior art seen in European Patent EP 0 890 313 B1, the side blades 58 and 60 of the present invention are mounted so that they can move towards and away from the blade disk 26. Springs 64a–64d urge the side blades in towards the rotating removal blades to ensure that the cutting edges are always in contact. When they are in this normal cutting contact, the right side cutting edges 48 of the removal blades 40 and the right cutting edge 62 of the non-rotating side blade 60 lie in the same plane on the right side of the blade disk. Similarly, the left side cutting edges 50 of the removal blades 40 and the left cutting edge 56 of the non-rotating side blade 58 lie in a cutting plane on the left side of the blade disk.

As can be seen by comparing the angle of slot 54 to the axis of opening 66 in the right side of the housing, the right cutting edge 62 on the right side blade 60 extends at an angle to the right cutting edge 48 of the removal blade 40 in the right side cutting plane. The length of the cutting edge 62 is such that the right cutting blade edge is always in simultaneous contact with at least two of the side cutting edges 48 on the removal blades. This contact supports the right blade 60 against further inward motion under the pressure of right side springs 64c and 64d.

As the removal blades 40 wear, the right side cutting blade 60 progressively moves inward, always remaining in contact with the right side cutting edges of the removal blades. This self-adjustment feature significantly increases the time between blade changes as compared to the prior art designs. It also makes it much easier to resharpen the inner removal blades 40 or the outer side blades 58, 60 because the distance between the outer blades no longer need to remain fixed.

The left side blade 58 operates in the same manner in cooperation with the left side cutting edges 50 of the removal blades 40. The floating mount of the left side blade 58 includes bearing openings 74 and 76, which slide on corresponding shafts 78 and 80. The shafts 78 and 80 mounted perpendicularly between a back support plate 82 and the housing cover 30 with attachment bolts 84 and 86.

Left side springs 64a and 64b are located around shafts 80 and 78 respectively. The perpendicularly mounted shafts 78 and 80 and the slide bearing openings 74 and 76 cooperate to keep the motion of blade 58 substantially perpendicular to the plane of rotation of blade disk 26. This design prevents the side blade from tipping. The multiple cutter contact between side blade edge 56 and the removal blades 40 cuts the spinal cord membrane into small pieces during each rotation with a scissors-like shearing action.

Two setscrews 88a and 88b threaded into corresponding threaded openings in the support plate restrict outward travel of the support plate 82. The setscrews extend through the plate 82 until their tips are close to the back surface of blade 58, but not in contact therewith. This allows the side blade 58 to float, but prevents it from moving fully outward to completely compress the springs 64a and 64b. This limitation on motion keeps the side blade cutting edge near to the side cutting edges 50 on the removal blades and cuts thick pieces of spinal cord waste material which might otherwise push the side blade 58 outwards. Once the setscrews 88a and 88b are adjusted, the adjustment is fixed by tightening nuts 89a and 89b on the setscrews.

The mounting of the right side blade 60 is substantially identical to the mounting of the left side blade and will not be described in detail.

A waste removal tube 90 is connected at end 92 to a source of vacuum to remove waste material as it is brought into the tool by the spinning blade disk and chopped with the action of the side blades. The inner end of tube 90 is open to the housing and is positioned near the point where the side blades shear the incoming spinal cord membrane.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A spinal cord removal tool for removing a spinal cord and spinal cord membrane from a carcass comprising:

a motor;

a housing;

a blade disk mounted in the housing, the motor being connected to the blade disk to drive the blade disk in rotary motion;

a plurality of spinal cord removal blades mounted on the blade disk, each removal blade having a front cutting edge, a left cutting edge and a right cutting edge;

a left side blade mounted for motion towards and away from the left cutting edges of the spinal cord removal blades;

a left side self-adjusting mechanism for adjusting the left side blade relative to the left cutting edges of the spinal cord removal blades, the left side self-adjusting mechanism including at least one left side spring mounted to urge the left side blade towards the left cutting edges of the spinal cord removal blades;

a right side blade mounted for motion towards and away from the right cutting edges of the spinal cord removal blades; and a right side self-adjusting mechanism for adjusting the right side blade relative to the right cutting edges of the spinal cord removal blades, the right side self-adjusting mechanism including at least one right side spring mounted to urge the right side blade towards the right cutting edges of the spinal cord removal blades.

2. The spinal cord removal tool according to claim 1 further including an additional right side spring mounted to cooperate with the at least one right side spring to urge the right side blade towards the right cutting edges of the spinal cord removal blades and an additional left side spring mounted to cooperate with the at least one left side spring to urge the left side blade towards the left cutting edges of the spinal cord removal blades.

3. The spinal cord removal tool according to claim 1, further including at least one left side shaft perpendicularly mounted relative to a plane of rotation of the blade disk and at least one right side shaft perpendicularly mounted relative to the plane of rotation of the blade disk, the left side blade sliding on the left side shaft towards and away from the left cutting edges of the spinal cord removal blades and the right side blade sliding on the right side shaft towards and away from the right cutting edges of the spinal cord removal blades.

4. The spinal cord removal tool according to claim 1 further including:

a pair of left side shafts perpendicularly mounted relative to a plane of rotation of the blade disk;

a pair of right side shafts perpendicularly mounted relative to the plane of rotation of the blade disk;

an additional right side spring; and an additional left side spring;

the left side blade including a pair of left bearing openings receiving the left side shafts;

the right side blade including a pair of right bearing openings receiving the right side shafts;

the right side springs being mounted on the right side shafts to urge the right side blade towards the right cutting edges of the spinal cord removal blades; and the left side springs being mounted on the left side shafts to urge the left side blade towards the left cutting edges of the spinal cord removal blades.

5. The spinal cord removal tool according to claim 1 wherein the right and left side self-adjusting mechanisms further include corresponding right and left support plates, the right support plate being located outside the right side blade and the left support plate being located outside the left side blade.

6. The spinal cord removal tool according to claim 5 wherein the at least one left side spring is located between the left support plate and the left side blade and the at least one right side spring is located between the right support plate and the right side blade.

7. The spinal cord removal tool according to claim 1 wherein the right and left side self-adjusting mechanisms further include corresponding stops for limiting outward motion of the side blades relative to the removal blades.

8. The spinal cord removal tool according to claim 1 wherein the right and left side blades include substantially straight cutting edges.

9. The spinal cord removal tool according to claim 1 wherein the side blades are in substantially continuous contact with at least two removal blades.

* * * * *